US010628206B2

(12) United States Patent
Hirose

(10) Patent No.: US 10,628,206 B2
(45) Date of Patent: Apr. 21, 2020

(54) INFORMATION PROCESSING APPARATUS AND SWITCHING METHOD OF DEVICE DRIVERS

(71) Applicant: FUJITSU LIMITED, Kawasaki-shi, Kanagawa (JP)

(72) Inventor: Motoyoshi Hirose, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 155 days.

(21) Appl. No.: 16/020,348

(22) Filed: Jun. 27, 2018

(65) Prior Publication Data

US 2019/0012195 A1    Jan. 10, 2019

(30) Foreign Application Priority Data

Jul. 10, 2017 (JP) ................. 2017-134790

(51) Int. Cl.
| G06F 9/46 | (2006.01) |
| G06F 9/455 | (2018.01) |
| G06F 9/445 | (2018.01) |
| G06F 9/4401 | (2018.01) |
| G06F 8/656 | (2018.01) |

(52) U.S. Cl.
CPC .......... *G06F 9/45558* (2013.01); *G06F 8/656* (2018.02); *G06F 9/4411* (2013.01); *G06F 9/44521* (2013.01); *G06F 2009/45579* (2013.01)

(58) Field of Classification Search
CPC .... G06F 9/45558; G06F 8/656; G06F 9/4411; G06F 9/44521; G06F 2009/45579
See application file for complete search history.

(56) References Cited

U.S. PATENT DOCUMENTS

| 6,658,489 B1 | 12/2003 | Asselin | |
| 7,047,534 B2 * | 5/2006 | Sadovsky | G06F 13/102 |
| | | | 719/322 |
| 2001/0037417 A1 * | 11/2001 | Meyer | H04L 67/2823 |
| | | | 719/332 |
| 2015/0242254 A1 * | 8/2015 | Kim | G06F 9/4831 |
| | | | 711/151 |

FOREIGN PATENT DOCUMENTS

| JP | 11-203120 | 7/1999 |
| JP | 2001-318874 | 11/2001 |

* cited by examiner

*Primary Examiner* — Camquy Truong
(74) *Attorney, Agent, or Firm* — Fujitsu Patent Center

(57) ABSTRACT

An information processing apparatus includes, a memory that stores a program of a current device driver and a program of a new device driver that is an updated version of the current device driver; and a processor that performs an initialization process by acquiring a current device file for the current device driver and creating a virtual device file for the new device driver based on the current device file while access to the device using the current device driver is permitted, and generating a new device file by reflecting a setting information difference between setting information in the current device driver and setting information in the new device driver on the virtual device file while the access to the device using the current device driver is not permitted, starts the new device driver using the new device file, and switches the current device driver to the new device driver.

8 Claims, 17 Drawing Sheets

| PARAMETER | Read VALUE | EXPECTED VALUE |
|---|---|---|
| 1 | 0x01 | none |
| 2 | 0xFF | none |
| 3 | 0xFFFF2020 | 0xFFFF20A0 |
| 4 | 0xFFFF3040 | 0xFFFF3040 |
| 5 | 0x03 | 0x03 |
| ⋮ | ⋮ | ⋮ |
| n | 0x0A | none |
| ⋮ | ⋮ | ⋮ |

| CODE | VALUE |
|---|---|
| 0x00 | COMPLETE |
| 0x01 | VIRTUALLY COMPLETE |
| 0x02 | ERROR |
| ⋮ | ⋮ |

DRIVER CONFIGURATION FILE

- DRIVER PROPERTY FILE — 402a
- COMPATIBILITY FILE — 402b
- BINARY FILE — 402c
- CHECKSUM FILE — 402d

| FIELD NUMBER | CONTENT |
|---|---|
| 0 | DRIVER NAME |
| 1 | DEVICE ID (LAN, FC, HDD ...) |
| 2 | VENDER ID |
| 3 | DRIVER VERSION NUMBER (V05) |
| 4 | RELATIVE ADDRESS OF open FUNCTION |
| 5 | RELATIVE ADDRESS OF release FUNCTION |
| 6 | RELATIVE ADDRESS OF read FUNCTION |
| 7 | RELATIVE ADDRESS OF write FUNCTION |
| 8 | RELATIVE ADDRESS OF ioctl FUNCTION |
| 9 | RELATIVE ADDRESS OF dev_proxy FUNCTION |

| FIELD NUMBER | VERSION | ONLINE UPDATABILITY |
|---|---|---|
| 0 | V05 | OK |
| 1 | V04 | OK |
| 2 | V03 | OK |
| 3 | V02 | NG |
| 4 | V01 | NG |

| FIELD NUMBER | CONTENT |
|---|---|
| 0 | LOGICAL DEVICE NAME |
| 1 | DEVICE ID (LAN, FC, HDD ...) |
| 2 | VENDER ID |
| 3 | DRIVER VERSION NUMBER (V04) |
| 4 | ENTRY ADDRESS OF open FUNCTION |
| 5 | ENTRY ADDRESS OF release FUNCTION |
| 6 | ENTRY ADDRESS OF read FUNCTION |
| 7 | ENTRY ADDRESS OF write FUNCTION |
| 8 | ENTRY ADDRESS OF ioctl FUNCTION |
| 9 | ENTRY ADDRESS OF dev_proxy FUNCTION |
| 10 | OPERATING MODE (ACTUAL DEVICE) |
| 11 | OPERATING STATE (TYPICAL READING COMPLETE/TYPICAL OPEN/VIRTUAL OPEN) |
| 12 | STARTING ADDRESS OF MEMORY-MAPPED I/O |
| 13 | PCI BUS ADDRESS |
| 14 | (NOT USED) |

| FIELD NUMBER | CONTENT |
| --- | --- |
| 0 | LOGICAL DEVICE NAME |
| 1 | DEVICE ID (LAN, FC, HDD ...) |
| 2 | VENDER ID |
| 3 | DRIVER VERSION NUMBER (V05) |
| 4 | ENTRY ADDRESS OF open FUNCTION |
| 5 | ENTRY ADDRESS OF release FUNCTION |
| 6 | ENTRY ADDRESS OF read FUNCTION |
| 7 | ENTRY ADDRESS OF write FUNCTION |
| 8 | ENTRY ADDRESS OF ioctl FUNCTION |
| 9 | ENTRY ADDRESS OF dev_proxy FUNCTION |
| 10 | OPERATING MODE (VIRTUAL DEVICE) |
| 11 | OPERATING STATE (VIRTUAL READING COMPLETE/VIRTUAL OPEN) |
| 12 | ENTRY ADDRESS OF dev_proxy FUNCTION OF ACTUAL DEVICE DRIVER |
| 13 | PCI BUS ADDRESS |
| 14 | STARTING ADDRESS OF MEMORY-MAPPED I/O |

INFORMATION PROCESSING APPARATUS AND SWITCHING METHOD OF DEVICE DRIVERS

CROSS-REFERENCE TO RELATED APPLICATION

This application is based upon and claims the benefit of priority of the prior Japanese Patent Application No. 2017-134790, filed on Jul. 10, 2017, the entire contents of which are incorporated herein by reference.

FIELD

The embodiments discussed herein are related to an information processing apparatus and a switching method of device drivers.

BACKGROUND

Various devices may be connected to an information processing apparatus such as a computer. Software called a device driver is used for access to the device. The device driver may be updated for improving capabilities and correcting faults. Therefore, a method of updating the device driver while reducing influence on a system is considered.

For example, an information processing apparatus that monitors the frequency of input and output requests issued to an old device driver operating before an update, and detects a timing at which an update to a new device driver can be safely performed is suggested. In this suggestion, the information processing apparatus monitors the end of input and output requests that are already received in the old device driver, and sets new input and output requests to a pending state. The old device driver is unloaded, and then, the new device driver is embedded and initialized in an operating system. The pending input and output requests are executed in the new device driver. Then, typical input and output processes are resumed.

In addition, a structure of a device driver that is split into a shell device driver and a physical layer device driver is suggested. The shell device driver provides a system driver interface for connection to an operating system. The physical layer device driver is used for connection to a physical device. In this suggestion, when the physical layer device driver is replaced, the shell device driver retains the current device state of the physical device and hands over the current device state of the physical device to a physical layer device driver after replacement.

As described, in the update of the device driver, access to the device using the new device driver may be started after device access using the current device driver is stopped. In this case, at the timing of switching, a time period is taken for the initialization process for the new device driver, and a time period of inaccessibility to the device is present. When the time period of inaccessibility to the device is extended, there is a possibility of adverse effects such as the occurrence of a timeout in the process of an application or middleware that uses the device.

The related art is disclosed in the following documents: Japanese Laid-open Patent Publication No. 11-203120 and Japanese Laid-open Patent Publication No. 2001-318874.

SUMMARY

According to an aspect of the embodiments, an information processing apparatus includes, a memory that stores a program of a current device driver and a program of a new device driver that is an updated version of the current device driver; and a processor that performs an initialization process by acquiring a current device file for the current device driver and creating a virtual device file for the new device driver based on the current device file while access to the device using the current device driver is permitted, and generating a new device file by reflecting a setting information difference between setting information in the current device driver and setting information in the new device driver on the virtual device file while the access to the device using the current device driver is not permitted, starts the new device driver using the new device file, and switches the current device driver to the new device driver.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of a device initialization table;

FIG. 6 is a diagram illustrating an example of a driver initialization complete code;

FIG. 7 is a diagram illustrating an example of a driver configuration file;

FIG. 8 is a diagram illustrating an example of a driver property file;

FIG. 9 is a diagram illustrating an example of a compatibility file;

FIG. 10 is a diagram illustrating an example of an actual device file;

FIG. 11 is a diagram illustrating an example of a virtual device file;

DESCRIPTION OF EMBODIMENTS

Hereinafter, embodiments will be described with reference to the drawings.

First Embodiment

Figure 1:
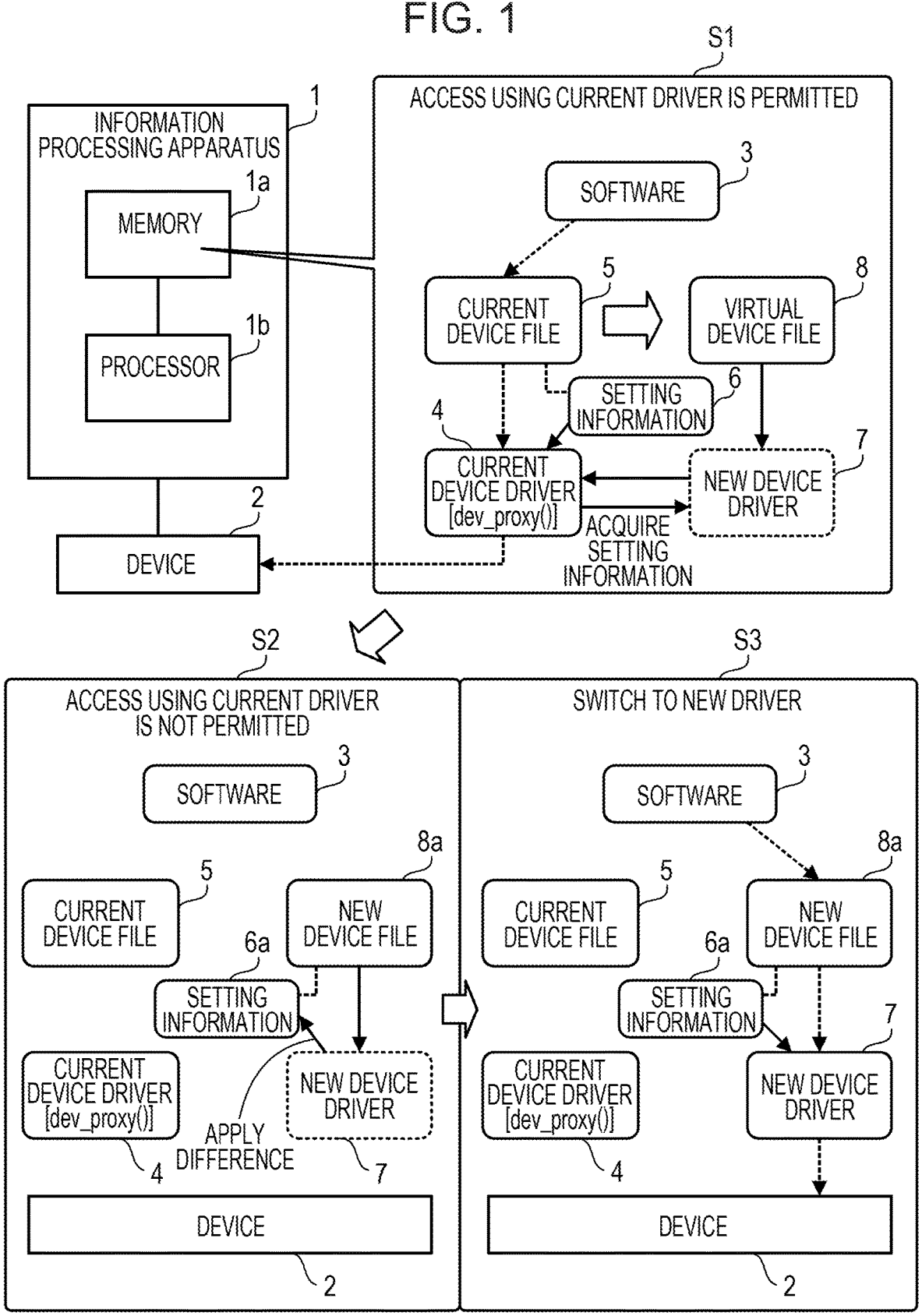
FIG. 1 is a diagram illustrating an information processing apparatus of a first embodiment.

FIG. 1 is a diagram illustrating an information processing apparatus of a first embodiment. An information processing apparatus 1 is connected to a device 2. The device 2 is hardware that is externally attached to or incorporated in the information processing apparatus 1. Examples of the device 2 include input and output devices such as a printer and a scanner, communication devices such as a network interface card (NIC), display devices such as a monitor, and sound devices such as a microphone and a speaker.

The information processing apparatus 1 executes software 3. The software 3 is an application, middleware, or the like. The software 3 uses a device driver 4 for access to the device 2. An operating system (OS) of the information processing apparatus 1 provides a device file 5 as an interface for the software 3 to use the device driver 4. The "device file" is called a special file. Based on the device file 5, the software 3 calls a specific function for the device driver 4 and instructs the device driver 4 to access the device 2. The device file 5 also includes a link to setting information 6 that is used in the process of the device driver 4. For example, the setting information 6 includes a setting value of a predetermined parameter that is retained in a memory or a register of the device 2. The setting information 6 also includes a setting value of a predetermined parameter that is used for control of the operation of the device driver 4.

The device driver 4 may be updated by a distributer for improving capabilities, correcting faults, and the like. For example, the version of the device driver 4 is updated to an updated device driver 7. In the information processing apparatus 1, the device driver 4 is stopped at a timing immediately before the device driver 4 used for access to the device 2 is switched to the device driver 7. Thus, a time period (a time period of stoppage of access) of inaccessibility to the device 2 is present. Therefore, the information processing apparatus 1 provides a capability of reducing the time period of stoppage of access to the device 2 accompanied by switching of the device driver.

Hereinafter, the device driver 4 that is currently used for access to the device 2 from the software 3 will be referred to as the current device driver 4. In addition, the device file 5 will be referred to as the current device file 5. Furthermore, the device driver 7 that is an updated version of the current device driver 4 will be referred to as the new device driver 7.

The information processing apparatus 1 includes a memory 1a and a processor 1b. The memory 1a may be a volatile storage circuit such as a random access memory (RAM), or may be a non-volatile storage circuit such as a hard disk drive (HDD) or a flash memory. The processor 1b may include a central processing unit (CPU), a digital signal processor (DSP), an application specific integrated circuit (ASIC), a field programmable gate array (FPGA), or the like. The processor 1b may be a processor that executes programs. The "processor" may include a set of a plurality of processors (multiprocessor).

The memory 1a stores the program of the software 3, the program of the current device driver 4, and the program of the new device driver 7. In addition, the memory 1a stores the current device file 5 and the setting information 6. Furthermore, the memory 1a stores a virtual device file 8 that is generated for the new device driver 7.

The processor 1b exhibits the capabilities of the software 3, the current device driver 4, and the new device driver 7 by executing each program stored in the memory 1a. The processor 1b receives an instruction to switch the current device driver 4 to the new device driver 7. For example, the instruction is input into the information processing apparatus 1 by a user. The processor 1b acquires the current device file 5 corresponding to the current device driver 4 while access to the device 2 using the current device driver 4 is permitted. The processor 1b generates the virtual device file 8 for the new device driver 7 based on the acquired current device file 5 (step S1). While access is permitted, the software 3 accesses the device 2 using the current device driver 4 through the current device file 5.

At this point, the new device driver 7 operates in a state (a restricted state where a part of functions is restricted) where only a specific function for reading the setting information of the current device driver 4 can be used among the functions of the new device driver 7. The new device driver 7 in the restricted state returns a busy response with respect to an access request that is made for the device 2 using a read/write function. That is, the processor 1b acquires a busy response from the new device driver 7 with respect to an access request that is made for the device 2 through the virtual device file 8. The reason is that the occurrence of an inappropriate device operation of the new device driver 7 is suppressed, and influence on device access using the current device driver 4 is reduced. In FIG. 1, the new device driver 7 in the restricted state is illustrated by a dotted box.

The virtual device file 8 enables access to a predetermined function of the current device driver 4 using the new device driver 7 in the restricted state, and enables the setting information 6 of the current device driver 4 to be read. The current device driver 4 includes the predetermined function (for example, referred to as a "dev_proxy function") in advance. The dev_proxy function has a capability of reading the setting information 6 of the current device driver 4. The virtual device file 8 includes a link to the dev_proxy function (for example, the address of the entry point of the dev_proxy function). The processor 1b acquires the setting information 6 by calling the dev_proxy function of the current device driver 4 using the new device driver 7 based on the link of the virtual device file 8. The processor 1b can extract a setting information difference between the setting information 6 and setting information set in advance in the new device driver 7 by comparing the setting information 6 with the setting information in the new device driver 7. The processor 1b stores the extracted setting information difference in the memory 1a. The new device driver 7 also includes the dev_proxy function (not illustrated in FIG. 1) for the next update.

While access to the device 2 using the current device driver 4 is not permitted, the processor 1b generates a new device file 8a by reflecting the setting information difference between the setting information 6 in the current device driver 4 and the setting information in the new device driver on the virtual device file 8 (step S2). The processor 1b performs an initialization process for the new device driver 7 in steps S1 and S2 (starts the initialization from step S1 and completes the initialization in step S2).

While access is not permitted, the access of the software 3 to the device 2 using the current device driver 4 through the current device file 5 is stopped. The process of reflecting the setting information difference on the virtual device file 8 includes a process of changing the link to the dev_proxy function in the virtual device file 8 to the link to the setting information 6, and a process of applying the setting information difference to the setting information 6. Setting information 6a is setting information after the setting information difference is applied to the setting information 6. In this manner, the processor 1b creates the new device file 8a from the virtual device file 8.

The reason for reflecting the setting information difference while access using the current device driver 4 is not permitted is that there is a possibility of an update on the setting information 6 while access using the current device driver 4 is permitted (when the current device driver 4 is in operation). In addition, when the setting of the device driver 7 is written into the setting information 6 in the middle of access using the current device driver 4, device access using the current device driver 4 may be affected.

The processor 1b starts the new device driver 7 using the new device file 8a, and switches the current device driver 4 to the new device driver 7 (step S3). Specifically, the processor 1b changes the restricted state of the new device driver 7 to a state where all capabilities of the new device driver 7 can be used (that is, starts the new device driver 7), and enables the software 3 to access the device 2 through the new device file 8a. The new device driver 7 uses the setting information 6a for access to the device 2 based on the new device file 8a. The processor 1b releases the current device driver 4.

The information processing apparatus 1 can reduce the time period of stoppage of access to the device. As described above, in the update of the device driver, access to the device 2 using the new device driver 7 may be started after device access using the current device driver 4 is stopped. In this case, at the timing of switching, a time period is taken for the initialization process for the new device driver 7, and a time period of inaccessibility to the device 2 is present. In the initialization process, preparations for starting device access using the device driver such as creating a device file and loading the setting information of the device driver into the memory are performed.

Particularly, starting the initialization process for the new device driver 7 at the timing of switching the current device driver 4 to the new device driver 7 is considered. However, by doing so, the device 2 may not be accessed during a time period from the start to the end of the initialization process after the current device driver 4 is stopped, and there is a high possibility that the time period of stoppage of access to the device 2 is extended. When the time period of inaccessibility to the device 2 is extended, there is a possibility of adverse effects such as the occurrence of a timeout in the process of the software 3 that uses the device 2.

Therefore, the processor 1b starts the initialization of the new device driver 7 using the virtual device file 8, and proceeds with the initialization process during the operation of the current device driver 4. After the current device driver 4 is stopped, the processor 1b completes the initialization process by applying only the setting information difference between the current device driver 4 and the new device driver 7 in the whole setting information of the new device driver 7. Performing a part of the initialization process for the new device driver 7 during the operation of the current device driver 4 reduces the time period of stoppage of access to the device 2. Particularly, compared to the case of setting the whole setting information after the stoppage of the current device driver 4, a time period for a setting process that occurs after the stoppage of the current device driver 4 can be reduced, and the time period of stoppage of access to the device 2 that is present until switching can be reduced. Consequently, the possibility of adverse effects such as a timeout in the process of the software 3 that uses the device 2 can be reduced.

Hereinafter, the capability of the information processing apparatus 1 will be described in further detail with a specific server computer (hereinafter, referred to as a server) having the capability of the information processing apparatus 1 as an example.

Second Embodiment

Figure 2:
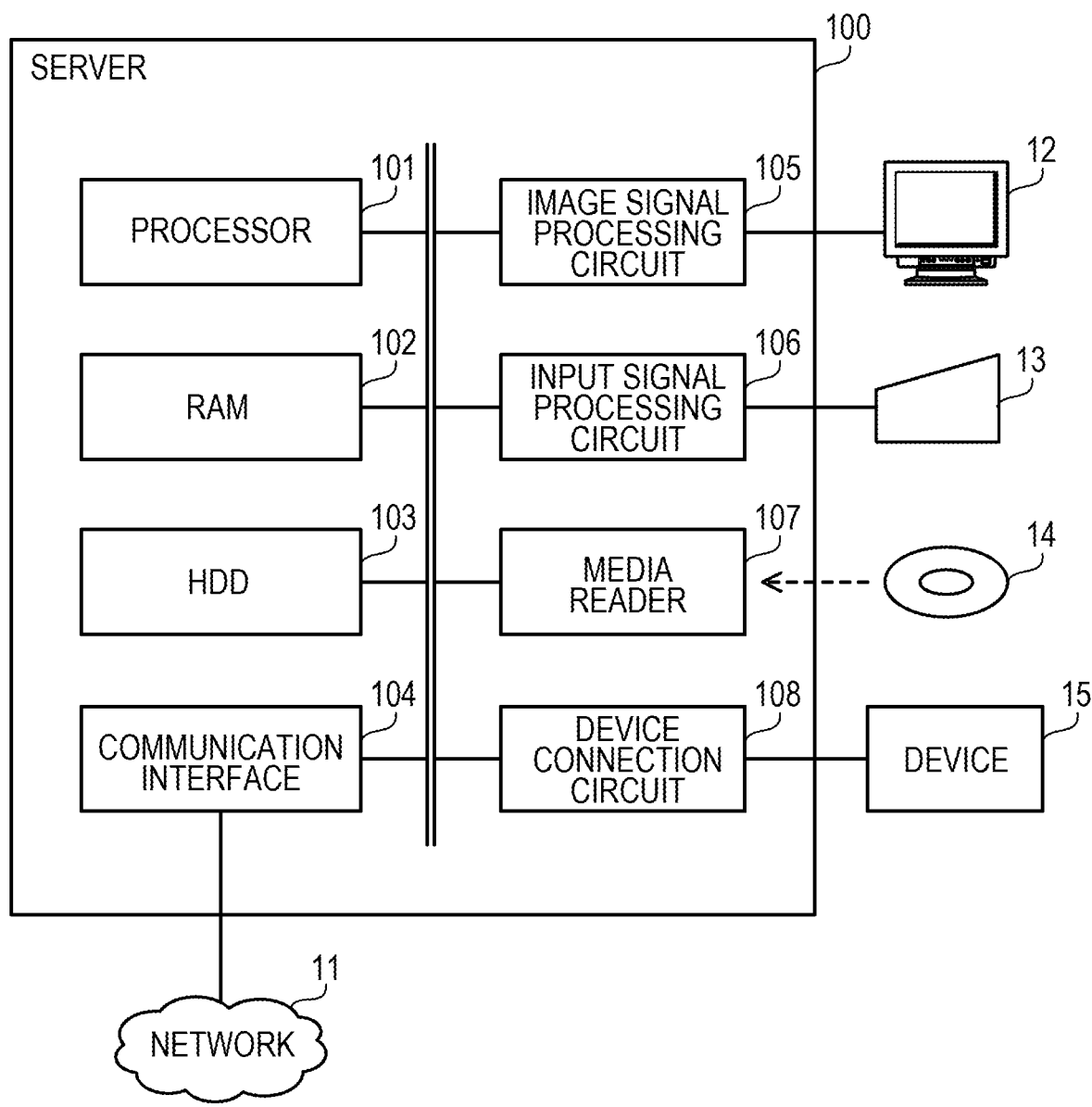
FIG. 2 is a diagram illustrating a hardware example of a server of a second embodiment.

FIG. 2 is a diagram illustrating a hardware example of a server of a second embodiment. A server 100 includes a processor 101, a RAM 102, an HDD 103, a communication interface 104, an image signal processing circuit 105, an input signal processing circuit 106, a media reader 107, and a device connection circuit 108.

The processor 101 is hardware that controls the information processing of the server 100. The processor 101 may be a multiprocessor. The processor 101 is, for example, a CPU, a DSP, an ASIC, or an FPGA. The processor 101 may be a combination of two or more elements of a CPU, a DSP, an ASIC, an FPGA, and the like.

The RAM 102 is a main storage circuit of the server 100. The RAM 102 temporarily stores at least a part of an OS program or an application program executed by the processor 101. In addition, the RAM 102 stores various pieces of data that are used in the process of the processor 101.

The HDD 103 is an auxiliary storage circuit of the server 100. The HDD 103 magnetically writes and reads data on an incorporated magnetic disk. The HDD 103 stores the OS program, the application program, and various pieces of data. The server 100 may include other kinds of auxiliary storage circuits such as a flash memory and a solid state drive (SSD), or may include a plurality of auxiliary storage circuits.

The communication interface 104 is a communication interface for connection to a network 11. For example, an Ethernet (registered trademark) interface can be used as the communication interface 104.

The image signal processing circuit 105 outputs an image to a display 12 connected to the server 100 in accordance with an instruction from the processor 101. A cathode ray tube (CRT) display, a liquid crystal display, or the like can be used as the display 12.

The input signal processing circuit 106 acquires an input signal from an input device 13 connected to the server 100, and outputs the input signal to the processor 101. For example, a pointing device such as a mouse or a touch panel, or a keyboard can be used as the input device 13.

The media reader 107 is a device that reads a program or data recorded on a recording medium 14. For example, a magnetic disk such as a flexible disk (FD) or an HDD, an optical disc such as a compact disc (CD) or a digital versatile disc (DVD), or a magneto-optical disk (MO) can be used as the recording medium 14. In addition, for example, a non-volatile semiconductor memory such as a flash memory card can be used as the recording medium 14. For example, the media reader 107 stores the program or the data read from the recording medium 14 in the RAM 102 or the HDD 103 in accordance with an instruction from the processor 101.

The device connection circuit 108 is an interface for connection to a device 15. For example, a printer, an external storage circuit, and various network devices can be connected to the device connection circuit 108 as the device 15. The device connection circuit 108 controls input and output for the device 15 in accordance with an instruction from the processor 101.

The server 100 is one example of the information processing apparatus 1 of the first embodiment. In addition, the device 15 is one example of the device 2 of the first embodiment. Furthermore, each of the communication interface 104 the display 12, the input device 13, the media reader 107, and the device connection circuit 108 is one example of the device 2 of the first embodiment.

Figure 3:
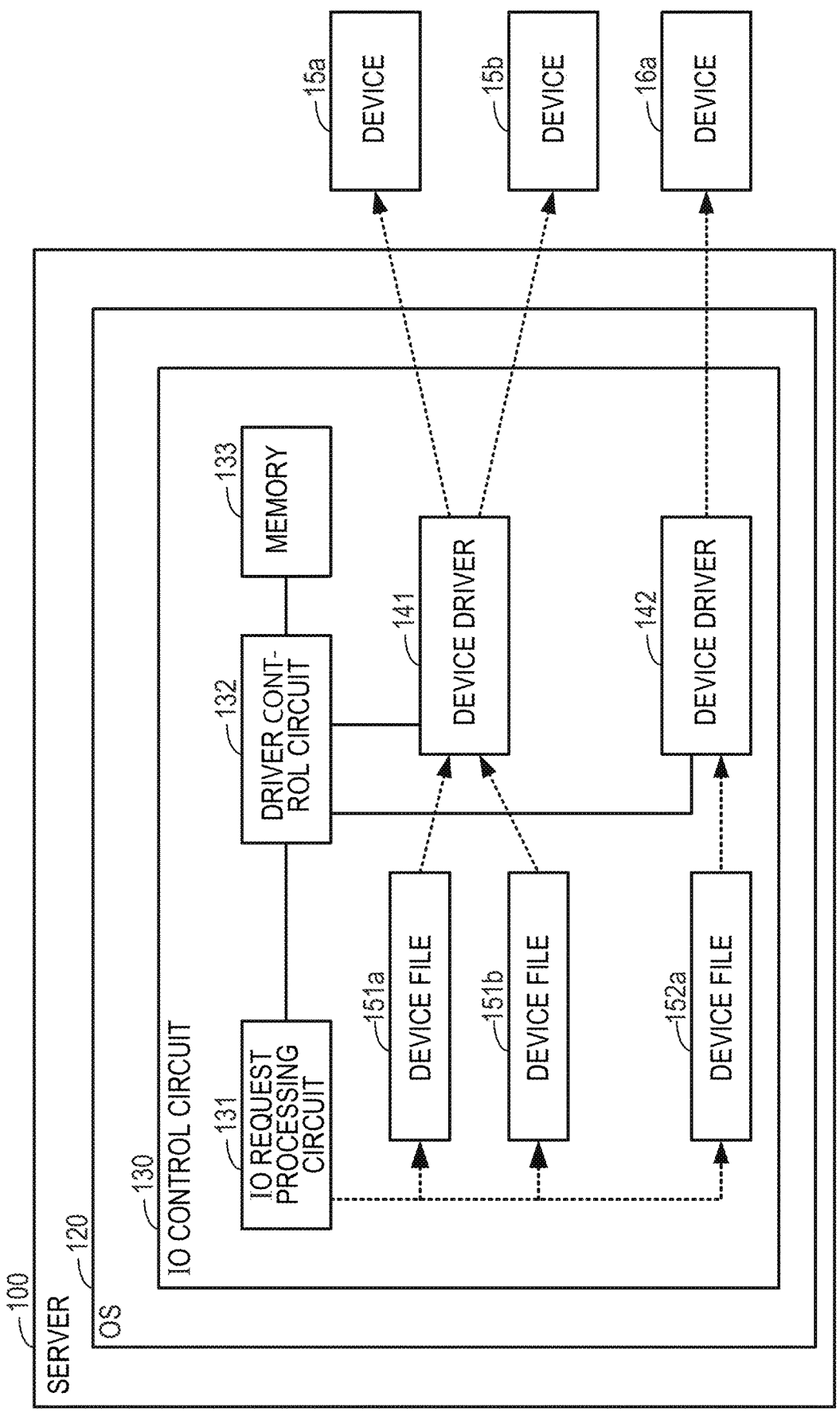
FIG. 3 is a diagram illustrating a software example of the server.

FIG. 3 is a diagram illustrating a software example of the server. The server 100 executes an OS 120 using the processor 101. The server 100 includes device drivers 141 and 142 and device files 151a, 151b, and 152a.

The OS 120 includes an input/output (IO) control circuit 130 that accesses the device 15. The IO control circuit 130 includes an IO request processing circuit 131, a driver control circuit 132, and a memory 133.

The IO request processing circuit 131 controls the device by accessing the device driver through the device file. For example, the IO request processing circuit 131 controls input and output for the device, blocks the device, and releases the device from blocking in accordance with an instruction from the driver control circuit 132.

The driver control circuit 132 receives an update instruction for the device from a management server program or the like operated by a system manager, and manages the state of the device, updates the device, and provides instructions to the IO request processing circuit 131.

The memory 133 stores control information that is used in the process of the driver control circuit 132. The memory 133 is implemented using a storage region of the RAM 102 or the HDD 103. In addition, the memory 133 stores the programs of the device drivers 141 and 142 and the device files 151a, 151b, and 152a.

The device driver is a program that controls the operation of the device. The device file is a special file that is used by software such as an application or middleware for access to the device. For example, the device file is called a special file or a device node. Functions (system calls) that operate the device are provided in advance by the OS. The functions operating the device include, for example, an open function, a release function, a read function, a write function, and an ioctl function.

For example, the device driver 141 controls the operation of the devices 15a and 15b. The device file 151a provides an interface for access to the device 15a. The device file 151b provides an interface for access to the device 15b.

The device driver 142 controls the operation of the device 16a. The device file 152a provides an interface for access to the device 16a. More specifically, when the IO request processing circuit 131 accesses the device file 151a using a system call, the device driver 141 is called, and the device 15a can be accessed. For example, when the IO request processing circuit 131 operates the device 15a, the IO request processing circuit 131 acquires a file descriptor by performing an open process for the device file 151a. The IO request processing circuit 131 operates the device 15a by executing processes in which the file descriptor is specified. In the case of releasing the device 15a, the IO request processing circuit 131 releases the acquired file descriptor. In the release of the file descriptor, the IO request processing circuit 131 performs a close process for the device file 151a.

In the same manner as for the device 15a, the IO request processing circuit 131 operates the device 15b using the device driver 141 through the device file 151b. In addition, the IO request processing circuit 131 operates the device 16a using the device driver 142 through the device file 152a.

Figure 4:
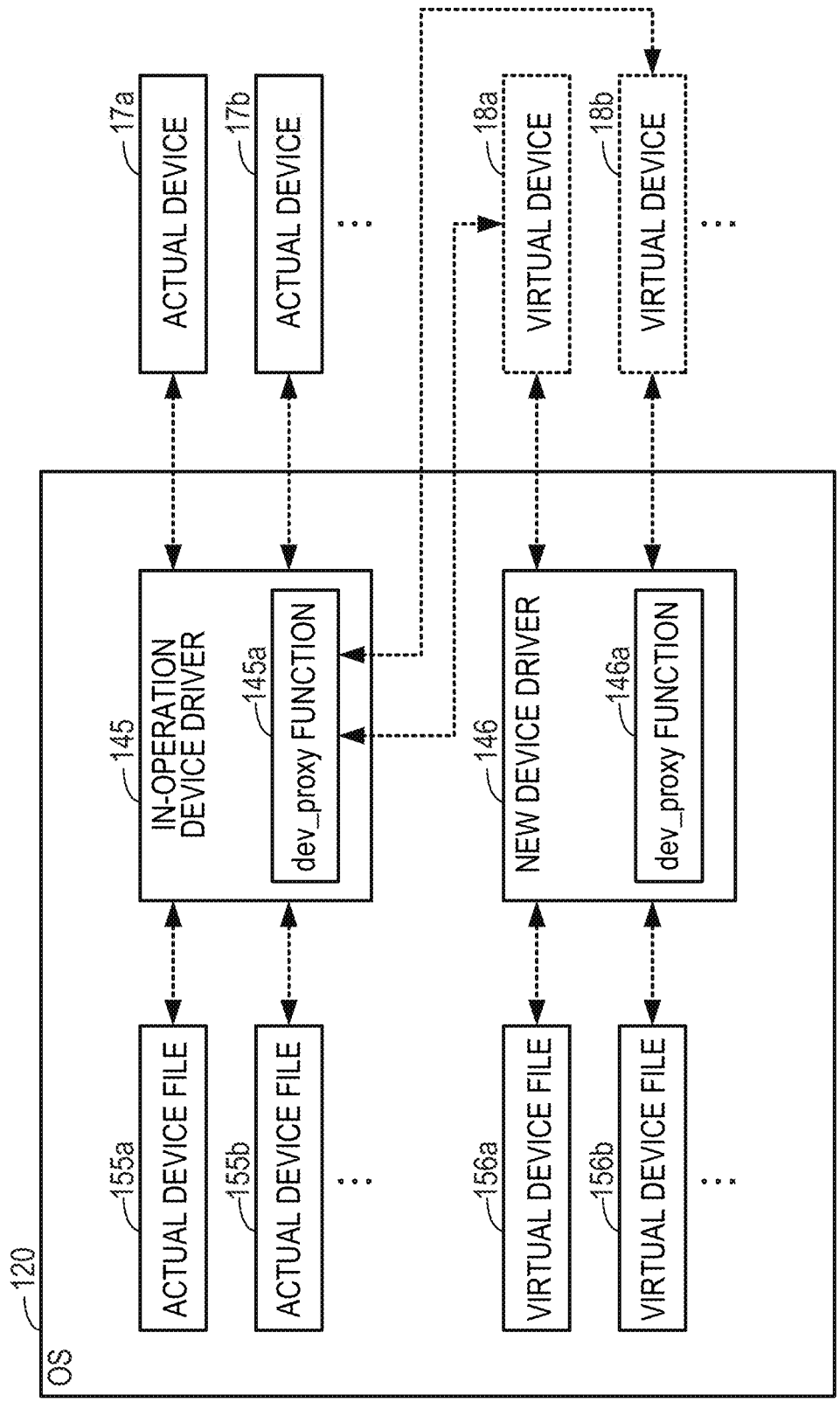
FIG. 4 is a diagram illustrating an example of a dev_proxy function.

FIG. 4 is a diagram illustrating an example of the dev_proxy function. Actual device files 155a and 155b are device files that are used for access to a device driver 145 in operation and actual devices 17a and 17b in operation. The device driver 145 in operation corresponds to the current device driver. In the following description, the device driver 145 in operation will be referred to as the in-operation device driver 145.

For example, the actual device file 155a is a device file for access to the actual device 17a using the in-operation device driver 145. The actual device file 155b is a device file for access to the actual device 17b using the in-operation device driver 145. The new device driver 146 is a new version of the device driver for the in-operation device driver 145.

A dev_proxy function 145a that receives access from the new device driver 146 is added in the device driver 145. The dev_proxy function 145a has a capability of providing information retained by the device driver 145 to the new device driver 146.

Virtual device files 156a and 156b are device files that are created for the new device driver 146. The virtual device file 156a is a device file that targets the dev_proxy function 145a (virtual device 18a) corresponding to the actual device 17a for access. The virtual device 18a is a virtual device that corresponds to the actual device 17a. The virtual device file 156b is a device file that targets the dev_proxy function 145a (virtual device 18b) corresponding to the actual device 17b for access. The virtual device 18b is a virtual device that corresponds to the actual device 17b.

The virtual device files 156a and 156b are used in a virtual open state. In the virtual open state, only a specific function (a function that is used for acquiring information through the dev_proxy function 145a) can be used among the functions of the new device driver 146, and the use of the other functions is restricted.

That is, the virtual device file 156a provides an interface for acquiring information related to the actual device 17a from the dev_proxy function 145a through the new device driver 146. The virtual device file 156b provides an interface for acquiring information related to the actual device 17b from the dev_proxy function 145a through the new device driver 146.

The new device driver 146 includes a dev_proxy function 146a for the next update of the device file and the like. FIG. 5 is a diagram illustrating an example of a device initialization table. A device initialization table 400 is stored in the memory 133. The device initialization table 400 is present for each device.

The device initialization table 400 retains information that is acquired from the device driver and the actual device in operation using the dev_proxy function. The device initialization table 400 includes fields of a parameter, a Read value, and an expected value.

Identification information of a parameter that is managed by the device driver is registered in the parameter field. Information that is acquired from the device driver in operation is set in the Read value field. A setting value that is set in advance in the new device file is registered in advance in the expected value field.

The entries of the device initialization table 400 will be described. For example, a parameter "1" has a Read value "0x01" and an expected value "none". The expected value "none" indicates that the expected value is not present, and any value is possible. The setting value of the parameter "1" in the new device file may not be changed (the Read value may be maintained).

A parameter "3" has a Read value "0xFFFF2020" and an expected value "0xFFFF20A0", and both are different from each other. The Read value and the expected value of the parameter "3" are different from each other, and there is a difference between the Read value and the expected value.

The expected value is applied in the new device file (the setting value is changed to the expected value from the Read value).

A parameter "5" has a Read value "0x03" and an expected value "0x03", and both are the same. Since the Read value and the expected value of the parameter "5" are the same, there is no difference between the Read value and the expected value. Thus, the setting value in the new device file may not be changed (the Read value may be maintained).

FIG. 6 is a diagram illustrating an example of a driver initialization complete code. A driver initialization complete code 401 is stored in the memory 133. The driver initialization complete code 401 includes information for determining whether or not the initialization of the driver is complete. The driver initialization complete code 401 includes fields of a code and a value. The code field indicates information that is included in a response at the time of inquiring whether or not the initialization of the driver is complete. The value field is information that indicates the content of the code. For example, a code "0x00" indicates that initialization is "complete". A code "0x01" indicates that initialization is "virtually complete". A code "0x01" indicates that initialization has "error".

FIG. 7 is a diagram illustrating an example of a driver configuration file. A driver configuration file 402 is stored in the memory 133. The driver configuration file 402 is the main body of the device driver. The driver configuration file 402 includes a driver property file 402a, a compatibility file 402b, a binary file 402c, and a checksum file 402d.

The driver property file 402a retains the name of the device driver, the version number of the device driver, a relative address at which a predetermined function (the open function or the like) is loaded in the RAM 102, and the like. The compatibility file 402b includes information that indicates whether or not the device driver can be updated online.

The binary file 402c is the binary data of the device driver. The binary file 402c is the main body of the program of the device driver. The checksum file 402d retains information for verifying the validity of the driver configuration file 402. For example, the checksum file 402d retains information for verifying that a part of the driver configuration file 402 is not damaged or not modified.

FIG. 8 is a diagram illustrating an example of the driver property file. The driver property file 402a is stored in the memory 133. The driver property file 402a includes fields of a field number and a content. The field number is information for identifying a storage region (field) in the driver property file 402a. The content is information that indicates the content of information stored in the field corresponding to the field number.

For example, the "driver name" of the device driver is set in the field of the field number "0". A "device ID" that is information for identifying the device driver is set in the field of the field number "1". For example, the identification name of the device such as LAN, FC, or HDD is set in the device ID.

A "vender ID" that is information for identifying a vender who is the provider of the device driver is set in the field of the field number "2". A "version number" that is information for identifying the version of the device driver is set in the field of the field number "3". For example, information such as "V05" is set in the version number.

A relative address ("relative address of the open function") at which the open function of the device driver is loaded is set in the field of the field number "4". The relative address indicates a relative value from the leading address of the device driver loaded in the RAM 102. A relative address ("relative address of the release function") at which the release function of the device driver is loaded is set in the field of the field number "5". A relative address ("relative address of the read function") at which the read function of the device driver is loaded is set in the field of the field number "6". A relative address ("relative address of the write function") at which the write function of the device driver is loaded is set in the field of the field number "7". A relative address ("relative address of the ioctl function") at which the ioctl function of the device driver is loaded is set in the field of the field number "8". A relative address ("relative address of the dev_proxy function") at which the dev_proxy function of the device driver is loaded is set in the field of the field number "9".

FIG. 9 is a diagram illustrating an example of the compatibility file. The compatibility file 402b is stored in the memory 133. The compatibility file 402b is a file including information that indicates whether or not the device driver can be updated online. The compatibility file 402b includes fields of a field number, a version, and online updatability.

The field number is information for identifying a field in the compatibility file 402b. The version is information for identifying the version of the device driver. The online updatability is information that indicates whether or not the device driver indicated in the version field can be updated online.

For example, the field of the field number "0" indicates that the online updatability of a version "V05" of the device driver is "OK (possible)". The field of the field number "3" indicates that the online updatability of a version "V02" of the device driver is "NG (not possible)".

FIG. 10 is a diagram illustrating an example of the actual device file. An actual device file 405 is stored in the memory 133. The actual device file 405 may be called the current device file. The actual device file 405 includes fields of a field number and a content. The field number is information for identifying a field in the actual device file 405. The content is information that indicates the content of information stored in the field corresponding to the field number.

For example, a "logical device name" for identifying the actual device file 405 is set in the field of the field number "0". The "device ID" that is information for identifying the device driver is set in the field of the field number "1". For example, the identification name of the device such as LAN, FC, or HDD is set in the device ID. The "vender ID" that is information for identifying a vender who is the provider of the device driver is set in the field of the field number "2".

The "version number" that is information for identifying the version of the device driver is set in the field of the field number "3". For example, V04 or the like is set in the version number. The entry address (the address of the entry point) of the open function is set in the field of the field number "4". The entry address indicates the absolute address of the function loaded in the RAM 102. The entry address of the release function is set in the field of the field number "5". The entry address of the read function is set in the field of the field number "6". The entry address of the write function is set in the field of the field number "7". The entry address of the ioctl function is set in the field of the field number "8". The entry address of the dev_proxy function is set in the field of the field number "9".

An "operating mode" that is information for identifying the execution state of the device driver is set in the field of the field number "10". For example, "actual device" is set as the operating mode of the actual device file 405. An "operating state" that is information for identifying the operating state of the device driver is set in the field of the field number "11". For example, any of "typical reading complete", "typical open", and "virtual open" is set as the operating state. An address (the starting address of memory-mapped I/O) that indicates the starting position of input or output data of the device driver in the RAM 102 is set in the field of the field number "12". A "PCI bus address" that is information for identifying the positional information of the device seen from a bus is set in the field of the field number "13". The field of the field number "14" is a non-used region.

FIG. 11 is a diagram illustrating an example of the virtual device file. A virtual device file 406 is stored in the memory 133. The virtual device file 406 includes fields of a field number and a content.

The field number is information for identifying a field in the virtual device file 406. The content is the content of information stored in the field corresponding to the field number. For example, the "logical device name" for identifying the virtual device file 406 is set in the field of the field number "0". The "device ID" that is information for identifying the device driver is set in the field of the field number "1". For example, the identification name of the device such as LAN, FC, or HDD is set in the device ID. The "vender ID" that is information for identifying a vender who is the provider of the device driver corresponding to the virtual device file 406 is set in the field of the field number "2".

The "version number" that is information for identifying the version of the device driver is set in the field of the field number "3". For example, V05 or the like is set in the version number. The entry address of the open function is set in the field of the field number "4". The entry address of the release function is set in the field of the field number "5". The entry address of the read function is set in the field of the field number "6". The entry address of the write function is set in the field of the field number "7". The entry address of the ioctl function is set in the field of the field number "8". The entry address of the dev_proxy function (the dev_proxy function of the new device driver corresponding to the virtual device file 406) is set in the field of the field number "9".

The "operating mode" that is information for identifying the execution state of the device driver is set in the field of the field number "10". For example, "virtual device" is set as the operating mode of the virtual device file 406.

The "operating state" that is information for identifying the operating state of the device driver is set in the field of the field number "11". For example, any of "virtual reading complete", and "virtual open" is set as the operating state.

The entry address of the dev_proxy function of the actual device driver (the device driver corresponding to the actual device file 405) is set in the field of the field number "12".

The PCI bus address is set in the field of the field number "13". The PCI bus address set in the field of the field number "13" is the same as that in the field of the same name in the actual device file 405.

Figure 12:
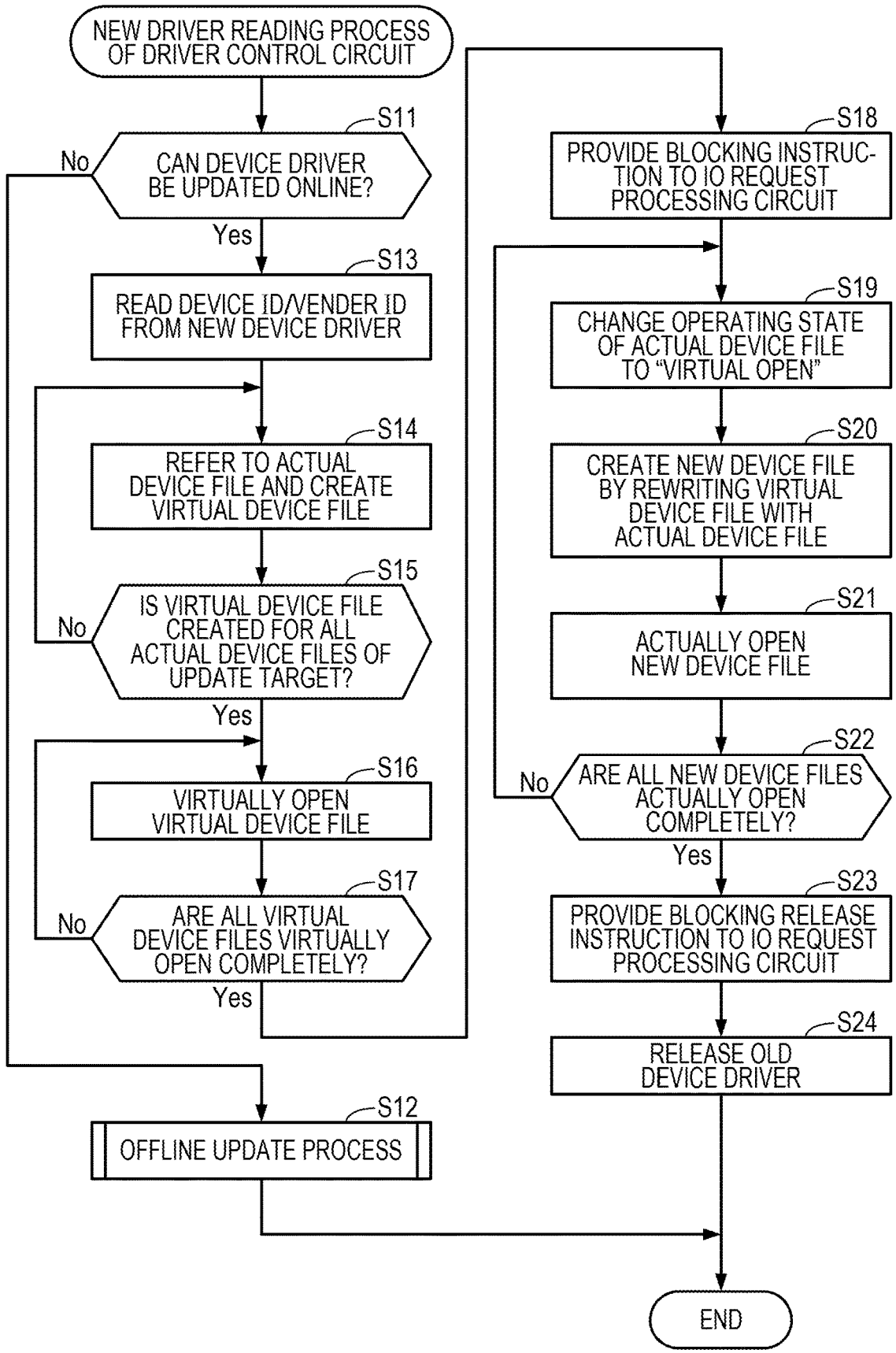
FIG. 12 is a flowchart illustrating an example of a new driver reading process of a driver control circuit.

The "starting address of memory-mapped I/O" that is information for identifying the starting position of the input or output data of the device driver is set in the field of the field number "14". FIG. 12 is a flowchart illustrating an example of a new driver reading process of the driver control circuit. Hereinafter, the process illustrated in FIG. 12 will be described in order of step numbers.

(S11) The driver control circuit 132 receives the update instruction for the device driver, and determines the online updatability of the device driver for which the update instruction is received. For example, the update instruction for the device driver is input by the user.

Specifically, the driver control circuit 132 acquires the version of the device driver for which the update instruction is received, and determines the online updatability by referring to the field of the online updatability in the compatibility file 402b. When the online update is possible, the driver control circuit 132 proceeds to step S13. When the online update is not possible, the driver control circuit 132 proceeds to step S12.

(S12) The driver control circuit 132 executes an offline update process for the device driver. The offline update process for the device driver is a process of blocking the actual device, updating the in-operation device driver to the new device driver, and releasing the actual device from blocking after the update. The offline update process for the device driver will be described later using FIG. 13.

(S13) The driver control circuit 132 reads the device ID and the vender ID from the driver property file 402a of the new device driver. The driver control circuit 132 confirms that the read device ID and the read vender ID match the device ID and the vender ID of the existing actual device file.

(S14) The driver control circuit 132 refers to the actual device file and creates the virtual device file. Specific contents of settings are illustrated in FIG. 11. Particularly, the driver control circuit 132 sets the entry address of the dev_proxy function of the actual device driver in the field of the field number "12" in the virtual device file. In addition, the driver control circuit 132 sets the operating state of the virtual device file to "virtual reading complete".

(S15) The driver control circuit 132 determines whether or not the virtual device file is created for all actual device files of the update target. When the virtual device file is created for all actual device files of the update target, the driver control circuit 132 proceeds to step S16. When the virtual device file is not created for all actual device files of the update target, the driver control circuit 132 proceeds to step S14 and creates the virtual device file for the non-processed actual device file.

(S16) The driver control circuit 132 sets the operating state of the virtual device file to the virtual open state. Unlike typical opening, virtual opening is a capability of setting a restricted state where the read function and the write function may not be executed. That is, the functions of the restriction target among the functions of the new device file may not be used in the virtual open state of the virtual device file. Even if the new device driver in the virtual open state receives an access request that is made for the device using the read/write function, the new device driver returns the busy response. Accordingly, influence on device access using the device driver in operation is reduced. At the time of virtual opening, the new device driver reads the value of each parameter retained by the current device driver through the dev_proxy function of the in-operation device driver using the "starting address of memory-mapped I/O" in the virtual device file as a parameter. The new device driver registers the read value of each parameter in the Read value of the device initialization table 400 stored in the memory 133.

(S17) The driver control circuit 132 determines whether or not all virtual device files created in step S14 are virtually open completely. When all virtual device files are virtually open completely, the driver control circuit 132 proceeds to step S18. When all virtual device files are not virtually open completely, the driver control circuit 132 proceeds to step S16 and virtually opens the virtual device file that is not virtually open yet.

(S18) The driver control circuit 132 instructs the IO request processing circuit 131 to block the actual device after waiting until all accesses (existing IO processes) to the current device are complete. The device that is a target for the blocking instruction is the device that is targeted for access by the device driver for which the update instruction is provided in step S11.

(S19) The driver control circuit 132 changes the operating state corresponding to the field number "11" of the actual device file to "virtual open". The driver control circuit 132 changes the operating mode at the field number "10" of the actual device file to "virtual device". The driver control circuit 132 retains the address at the field number "12" of the actual device file in another storage region, and changes the address to the "entry address of the dev_proxy function" of the new device file.

(S20) The driver control circuit 132 creates the new device file by rewriting the contents of settings of the virtual device file with the contents of settings of the actual device file. Specifically, the driver control circuit 132 changes the field of the field number "10" in the virtual device file to "actual device", and changes the field of the field number "12" in the virtual device file to the address (the address retained in step S19) that is set in the "starting address of memory-mapped I/O" at the field number "12" of the actual device file. Accordingly, the field of the field number "14" in the virtual device file is set as a non-used region. Furthermore, the driver control circuit 132 reflects the setting value of a parameter having a difference in the device initialization table 400 on the setting information indicated by the "starting address of memory-mapped I/O" in the virtual device file. The parameter having a difference is a parameter of which the Read value and the expected value are different from each other in the device initialization table 400. The reflected setting value is the expected value. For a parameter of which the expected value is "none", the existing setting can be used (the setting of the parameter is not changed). The virtual device file of which the settings are changed is the new device file. The driver control circuit 132 sets the operating state of the new device file to "typical reading complete".

(S21) The driver control circuit 132 actually opens (executes the open function) the new device file created in step S20. The operating state of the new device file is set to "typical open". Accordingly, the capabilities of all functions of the new device driver can be used through the new device file. That is, the new device file is started (the new device file is completely started) by step S21. At this point, the driver control circuit 132 uses the logical device name of the new device file as a logical device name for accessing the device, and instructs the IO request processing circuit 131 to access the device through the new device file.

(S22) The driver control circuit 132 determines whether or not all new device files are actually open completely. When all new device files are actually open completely, the driver control circuit 132 proceeds to step S23. When all new device files are not actually open completely, the driver control circuit 132 proceeds to step S19 and actually opens the new device file that is not actually open yet.

(S23) The driver control circuit 132 provides a blocking release instruction for the device to the IO request processing circuit 131. The device that is a target for the blocking release instruction is the device for which the blocking instruction is provided in step S18.

(S24) The driver control circuit 132 releases (executes the release function) the old device driver, and finishes the new driver reading process of the driver control circuit 132.

Specifically, for example, the driver control circuit 132 releases a storage region assigned to the device driver in execution (old device driver) by performing a release process for the device file, and finishes the new driver reading process of the driver control circuit 132.

In this manner, the driver control circuit 132 switches the old device driver to the new device driver by performing the online update. Particularly, the in-operation device driver (current device driver) includes a first dev_proxy function (first function) that responds with the setting information in the in-operation device driver. During the operation of the in-operation device driver (while access is permitted), the driver control circuit 132 executes the first dev_proxy function through the virtual device file, and acquires the setting information in the in-operation device driver. Accordingly, the current setting information can be acquired without impeding the operation of the in-operation device driver.

The new device driver includes a second dev_proxy function (second function) that responds with the setting information in the new device driver. When the in-operation device driver (current device driver) is switched to the new device driver, the driver control circuit 132 sets, in the current device file, the address (entry address) of the second dev_proxy function in the RAM 102. Accordingly, even if a fault occurs in the operation of the new device driver, the setting information of the new device driver can be acquired from the old device driver side. Therefore, the driver control circuit 132 can restore device access using the old device driver by executing the procedure in FIG. 12 with the new device driver and the old device driver replaced with each other.

Furthermore, the driver control circuit 132 stops the in-operation device driver after existing access using the in-operation device driver (current device driver) is complete, and switches the in-operation device driver to the new device driver. Accordingly, switching can be performed without stopping the existing access.

The new device driver may have two kinds of states including the virtual open state based on the virtual device file and the actual open state based on the new device file (acquired by changing the virtual device file). Thus, the driver control circuit 132 starts the new device driver in two steps. That is, while access to the device using the in-operation device driver is permitted, the driver control circuit 132 starts the new device driver in a first state (referred to as the restricted state or a semi-start state) where the capability of access to the device is restricted. In the first state, while the capabilities of virtual opening, performing the release process, and calling the dev_proxy function of the in-operation device driver can be used in the new device driver, device access using read/write is restricted. At the timing of switching after access to the device using the in-operation device driver is not permitted, the driver control circuit 132 starts the new device driver in a second state where all capabilities can be used. In this manner, by implementing the start state of the new device driver in two steps, the existing setting information can be acquired during the operation of the existing device driver while influence on the existing device access is reduced.

Figure 13:
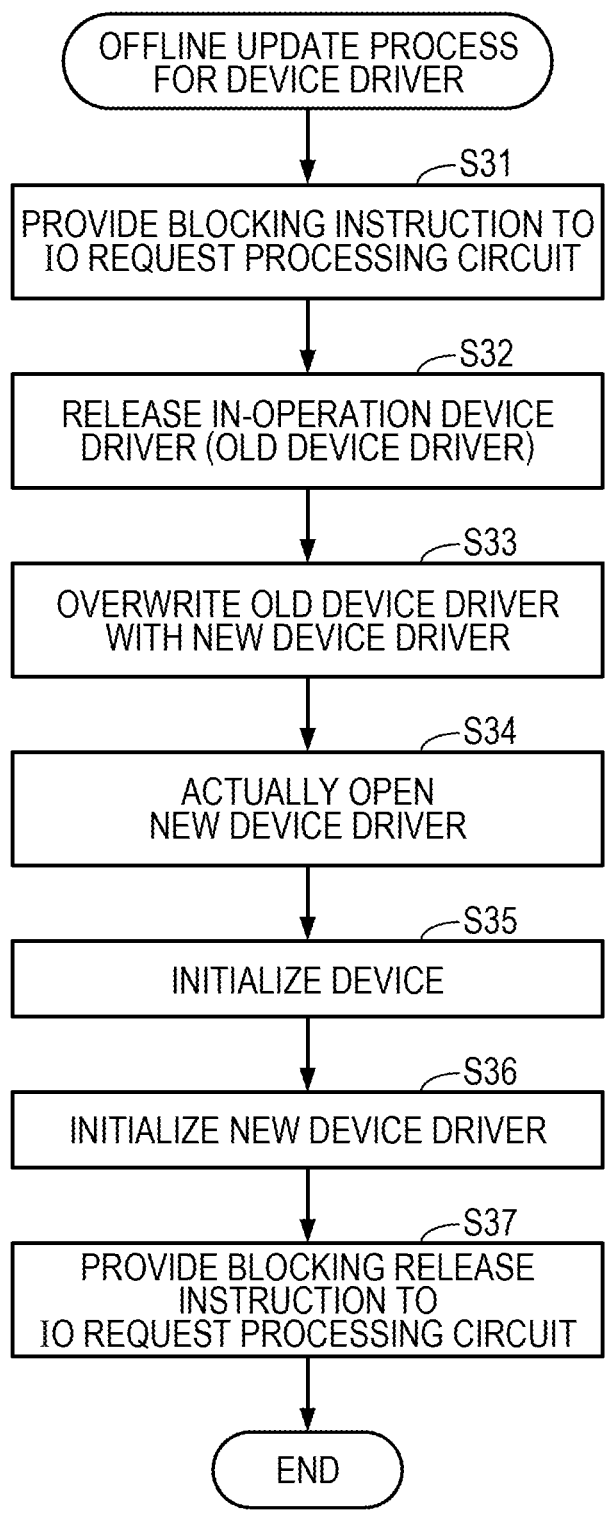
FIG. 13 is a flowchart illustrating an example of an offline update process.

FIG. 13 is a flowchart illustrating an example of an offline update process. The offline update process corresponds to step S12 of the new driver reading process of the driver control circuit. Hereinafter, the process illustrated in FIG. 13 will be described in order of step numbers.

(S31) The driver control circuit 132 instructs the IO request processing circuit 131 to block the actual device after waiting until all accesses (existing IO processes) to the current device are complete. The device that is a target for the blocking instruction is the device that is targeted for access by the device driver for which the update instruction is provided in step S11.

(S32) The driver control circuit 132 releases (executes the release function) the in-operation device driver (old device driver). (S33) The driver control circuit 132 overwrites the old device driver with the new device driver.

(S34) The driver control circuit 132 actually opens (executes the open function) the new device driver.

(S35) The driver control circuit 132 initializes the device. For example, the driver control circuit 132 sets all parameters used in the operation of the device.

(S36) The driver control circuit 132 initializes the new device driver. For example, the driver control circuit 132 sets all parameters used in the operation of the device driver.

Figure 14:
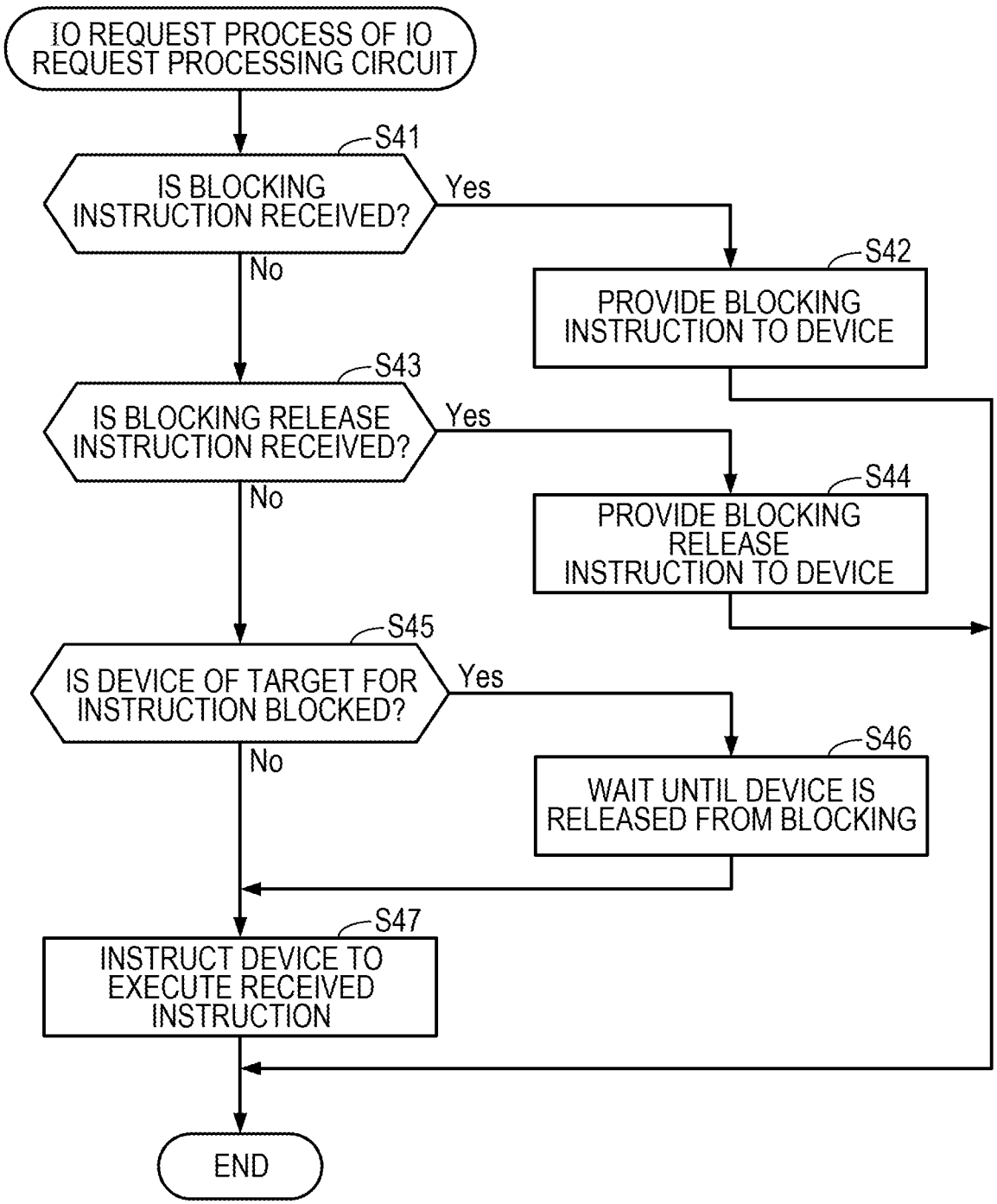
FIG. 14 is a flowchart illustrating an example of an IO request process.

(S37) The driver control circuit 132 provides the blocking release instruction for the actual device to the IO request processing circuit 131, and finishes the process. FIG. 14 is a flowchart illustrating an example of an IO request process. Hereinafter, the process illustrated in FIG. 14 will be described in order of step numbers. The IO request processing circuit 131 receives an instruction from the driver control circuit 132, and executes the present process.

(S41) The IO request processing circuit 131 determines whether or not the blocking instruction is received from the driver control circuit 132. When the blocking instruction is received, the IO request processing circuit 131 proceeds to step S42. When the blocking instruction is not received, the IO request processing circuit 131 proceeds to step S43.

(S42) The IO request processing circuit 131 provides the blocking instruction for the device to the device after the existing IO process is complete.

(S43) The IO request processing circuit 131 determines whether or not the blocking release instruction is received. When the blocking release instruction is received, the IO request processing circuit 131 proceeds to step S44. When the blocking release instruction is not received, the IO request processing circuit 131 proceeds to step S45.

(S44) The IO request processing circuit 131 provides the blocking release instruction for the device to the device.

(S45) The IO request processing circuit 131 determines whether or not the device that is a target for the received instruction is blocked. When the device is blocked, the IO request processing circuit 131 proceeds to step S46. When the device is not blocked, the IO request processing circuit 131 proceeds to step S47.

(S46) The IO request processing circuit 131 waits before executing an instruction for the device until the device is released from blocking. Specifically, the IO request processing circuit 131 suspends the execution of the instruction until the device is released from blocking.

(S47) The IO request processing circuit 131 provides the received instruction to the device to execute the instruction, and finishes the process. After the process is finished, the IO request processing circuit 131 is in a state waiting for an instruction from the driver control circuit 132.

Figure 15:
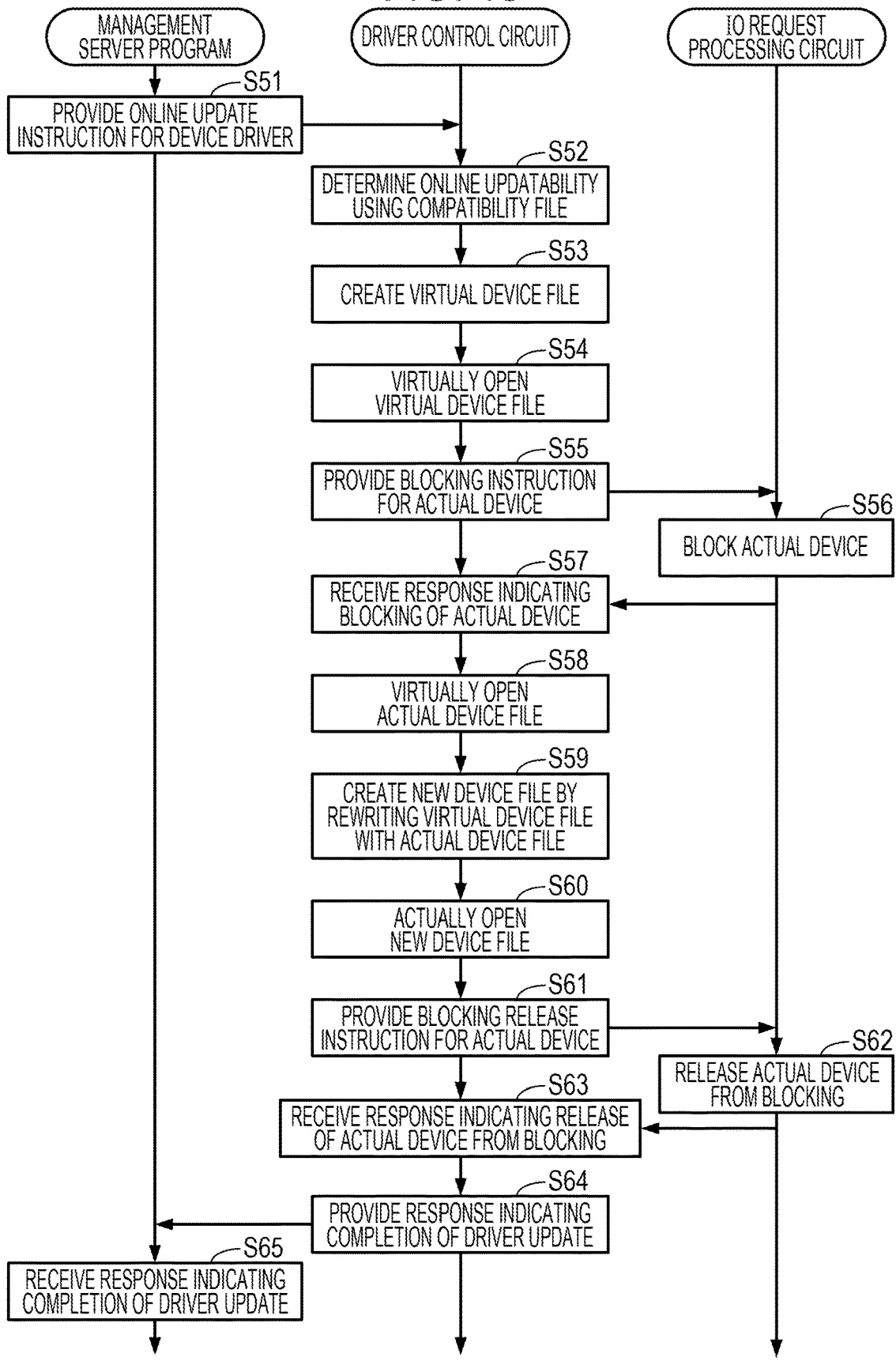
FIG. 15 is a sequence diagram illustrating an example of the new driver reading process.

FIG. 15 is a sequence diagram illustrating an example of the new driver reading process. Hereinafter, the process illustrated in FIG. 15 will be described in order of step numbers.

(S51) A server management program of the server 100 receives an instruction from the system manager, and provides an online update instruction for the device driver to the driver control circuit 132.

(S52) The driver control circuit 132 determines whether or not the device driver can be updated online based on the compatibility file 402b. Here, the driver control circuit 132 is assumed to determine that the device driver can be updated online.

(S53) The driver control circuit 132 creates the virtual device file that corresponds to the actual device file.

(S54) The driver control circuit 132 virtually opens the virtual device file.

(S55) The driver control circuit 132 provides the blocking instruction for the actual device to the IO request processing circuit 131.

(S56) The IO request processing circuit 131 executes a blocking process for the actual device.

(S57) The driver control circuit 132 receives, from the IO request processing circuit 131, a response that indicates that the execution of the blocking process for the actual device is complete.

(S58) The driver control circuit 132 virtually opens the actual device file.

(S59) The driver control circuit 132 rewrites the contents of settings of the virtual device file with the contents of settings of the actual device file. By the rewriting, the driver control circuit 132 creates the new device file from the virtual device file.

(S60) The driver control circuit 132 actually opens the new device file.

(S61) The driver control circuit 132 provides the blocking release instruction for the actual device file to the IO request processing circuit 131.

(S62) The IO request processing circuit 131 executes a blocking release process for the actual device.

(S63) The driver control circuit 132 receives, from the IO request processing circuit 131, a response that indicates that the blocking release process for the actual device is complete.

(S64) The driver control circuit 132 provides, to the server management program, a response that indicates that the update of the device driver is complete. For example, the driver control circuit 132 responds to the server management program with the code "0x00" based on the driver initialization complete code 401.

(S65) The server management program receives, from the driver control circuit 132, the response indicating that the update of the device driver is complete, and finishes the update process for the device driver. As described thus far, the server 100 permits partial access to the actual device using the virtual device file while the in-operation device driver 145 is updated to the new device driver 146.

Thus, a time period in which the device is blocked is reduced, and the time period of stoppage of access to the device from the server 100 is reduced. Consequently, the possibility of a timeout in the process of an application or middleware that uses the device can be reduced. As the number of devices as a target for switching the device driver is increased, the effect of reducing the time period of stoppage of access to the device is increased.

Particularly, in a general driver update, the number of parameters having a difference detected in the device initialization table 400 is relatively small. Accordingly, the driver control circuit 132 can execute the process of step S20 in FIG. 12 in a relatively short time period. Thus, a time period from a stoppage of device access using the current device driver to a time when device access using the new device driver can be started is significantly reduced, and a possibility that the time period is shorter than a waiting time period in the busy state of the device is increased. Accordingly, a possibility that switching of the device driver causes a timeout in a process that uses the device is reduced.

Consequently, the device driver is switched while influence on the work of the user is reduced.

Even if there is a fault in the operation of the new device driver, the new device driver can be switched back to the old device driver by maintaining the old device driver in the virtual open state until device access using the new device driver is started.

Third Embodiment

Next, a third embodiment will be described. In the description of the third embodiment, descriptions of the same parts as in the second embodiment will not be repeated.

The device may retain a table of internal information in the device driver. For example, in the case of an SSD, examples of such a table include a table of directory information or the number of writes per block for wear leveling. Copying such internal information to a storage region referred to by the new device driver from a storage region referred to by the current device driver at a certain timing is considered. However, when a large number of writes to the device through the current device driver occur, a large number of rewrites also occur in the table, and the current device driver may not be switched to the new device driver.

Therefore, the third embodiment provides a method of efficiently switching the current device driver to the new device driver for the device driver that retains the table of the internal information.

Figure 16:
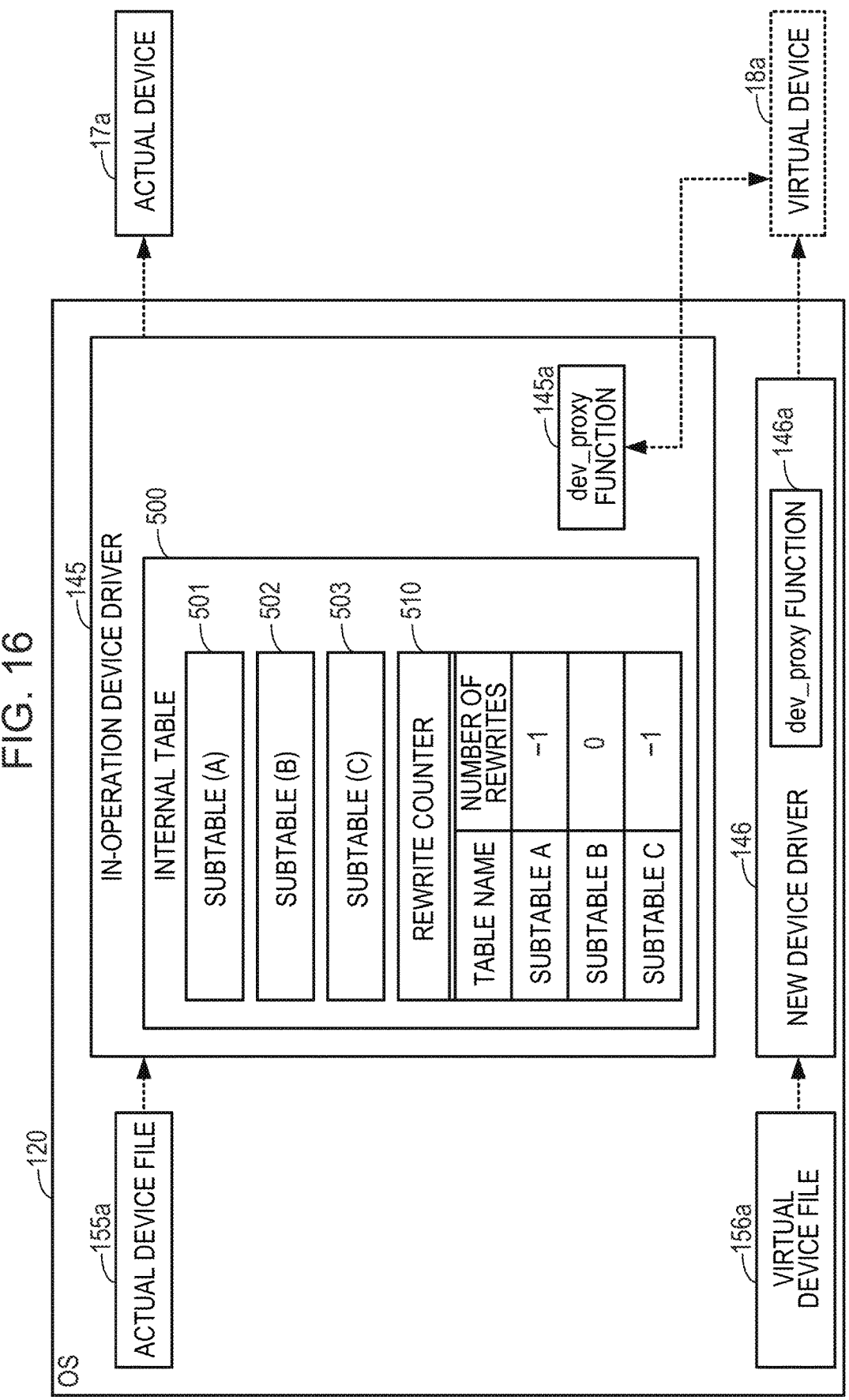
FIG. 16 is a diagram illustrating an example of an internal table of a third embodiment.

FIG. 16 is a diagram illustrating an example of an internal table of the third embodiment. An internal table 500 is stored in a predetermined storage region in the RAM 102. The internal table 500 includes subtables 501, 502, and 503 and a rewrite counter 510. Each subtable (subtables 501, 502, and 503) retains information that is used in the execution of the in-operation device driver 145. The identification name of the subtable 501 is "subtable A". The identification name of the subtable 502 is "subtable B". The identification name of the subtable 503 is "subtable C".

For example, each of the subtables 501, 502, and 503 may be acquired by splitting one table used for a specific capability in units of a predetermined size. Each of the subtables 501, 502, and 503 may be used for any of three kinds of capabilities of the in-operation device driver 145.

The rewrite counter 510 is information for managing the update status of each subtable. The rewrite counter 510 retains the number of rewrites for each subtable. The initial value of the number of rewrites of the rewrite counter 510 is "−1". When a table update is performed once in the state of the number of rewrites "−1", the number of rewrites is set to "1". Then, each time a table update is performed, the number of rewrites is incremented by one.

When the number of rewrites is "−1" or "larger than or equal to 1", the driver control circuit 132 reads the subtable of the current device driver through the dev_proxy function 145a, and copies the subtable in a storage region referred to by the new device driver in the RAM 102. At this point, the dev_proxy function 145a of the current device driver sets the number of rewrites to "0" for all subtables of the device.

Figure 17:
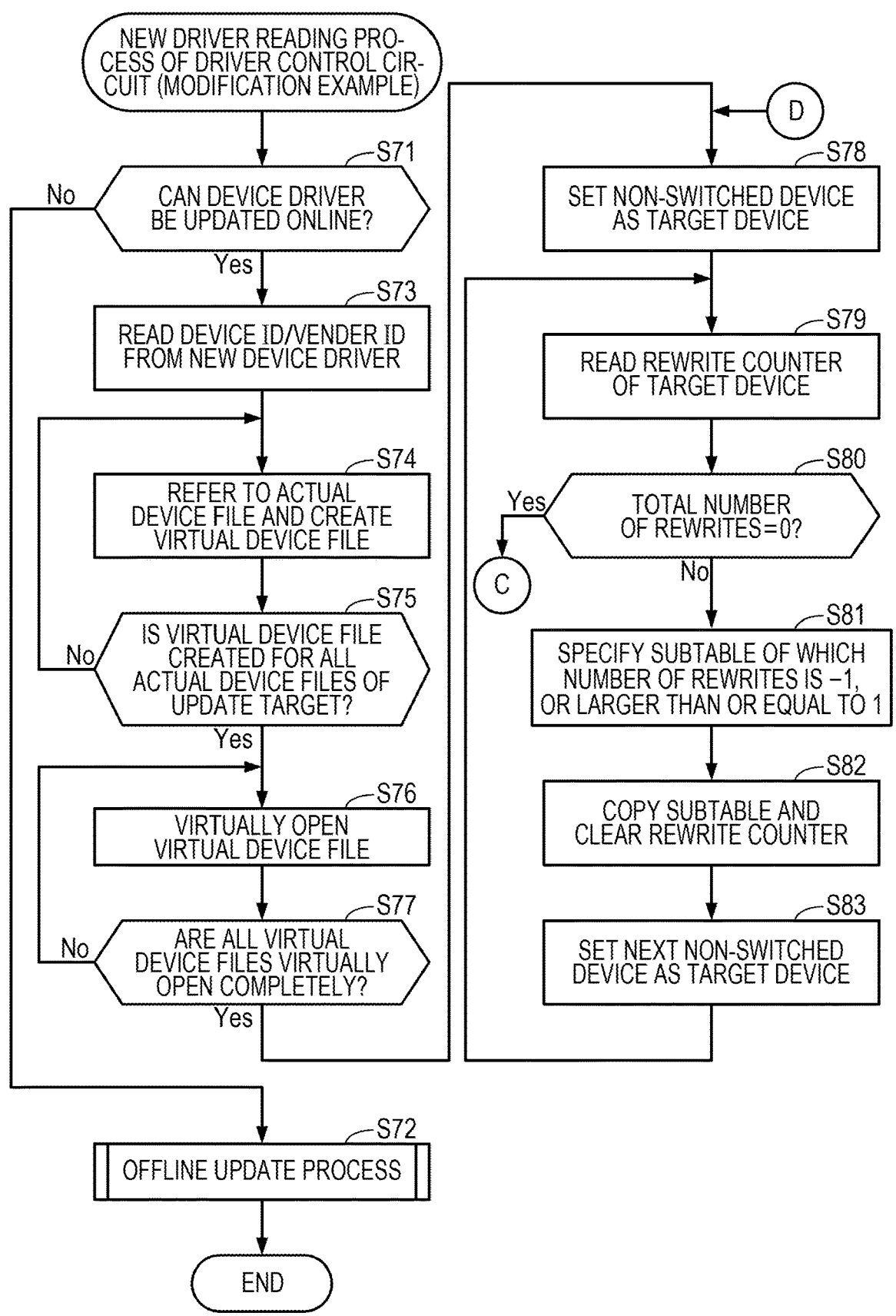
FIG. 17 is a flowchart illustrating an example of a new driver reading process.

FIG. 17 is a flowchart illustrating an example of the new driver reading process. Hereinafter, the process illustrated in FIG. 17 will be described in order of step numbers.

(S71) The driver control circuit 132 receives the update instruction for the device driver, and determines the online updatability of the device driver for which the update instruction is received. For example, the update instruction for the device driver is input by the user.

Specifically, the driver control circuit 132 acquires the version of the device driver for which the update instruction is received, and determines the online updatability by referring to the compatibility file 402b. When the online update is possible, the driver control circuit 132 proceeds to step S73. When the online update is not possible, the driver control circuit 132 proceeds to step S72.

(S72) The driver control circuit 132 executes the offline update process for the device driver. The online update process for the device driver is the same as in FIG. 13. Thus, a description of the online update process will not be repeated.

(S73) The driver control circuit 132 reads the device ID and the vender ID from the driver property file 402a of the new device driver. The driver control circuit 132 confirms that the read device ID and the read vender ID match the device ID and the vender ID of the existing actual device file.

(S74) The driver control circuit 132 refers to the actual device file and creates the virtual device file. Specific contents of settings are illustrated in FIG. 11. Particularly, the driver control circuit 132 sets the entry address of the dev_proxy function of the actual device driver in the field of the field number "12" in the virtual device file. In addition, the driver control circuit 132 sets the operating state of the virtual device file to "virtual reading complete".

(S75) The driver control circuit 132 determines whether or not the virtual device file is created for all actual device files of the update target. When the virtual device file is created for all actual device files of the update target, the driver control circuit 132 proceeds to step S76. When the virtual device file is not created for all actual device files of the update target, the driver control circuit 132 proceeds to step S74 and creates the virtual device file for the non-processed actual device file.

(S76) The driver control circuit 132 sets the operating state of the virtual device file to the virtual open state. Even if the new device driver in the virtual open state receives an access request that is made for the device using the read/write function, the new device driver returns the busy response. Accordingly, influence on device access using the device driver in operation is reduced. At the time of virtual opening, the new device driver reads the value of each parameter retained by the current device driver through the dev_proxy function of the in-operation device driver using the "starting address of memory-mapped I/O" in the virtual device file as a parameter. The new device driver registers the read value of each parameter in the Read value of the device initialization table 400 stored in the memory 133.

(S77) The driver control circuit 132 determines whether or not all virtual device files created in step S74 are virtually open completely. When all virtual device files are virtually open completely, the driver control circuit 132 proceeds to step S78. When all virtual device files are not virtually open completely, the driver control circuit 132 proceeds to step S76 and virtually opens the virtual device file that is not virtually open yet.

(S78) The driver control circuit 132 sets a target device to be a device of which the device driver is not switched yet. That is, the driver control circuit 132 sets a target device to be a device for which the in-operation device driver is not switched to the new device driver yet.

(S79) The driver control circuit 132 reads the number of rewrites of the rewrite counter 510 retained by the in-operation device driver of the target device using the dev_proxy function.

(S80) The driver control circuit 132 determines whether or not the number of rewrites is "0" for all subtables in the rewrite counter 510. When the number of rewrites is "0" for all subtables, the driver control circuit 132 proceeds to step S84 in FIG. 18. When the number of rewrites is not "0" for all subtables, the driver control circuit 132 proceeds to step S81.

(S81) The driver control circuit 132 specifies a subtable for which the number of rewrites is "−1" or larger than or equal to "1" (that is, a subtable for which the number of rewrites is other than "0").

(S82) The driver control circuit 132 acquires the subtable specified in step S81 using the dev_proxy function of the in-operation device driver, and copies the subtable in a used region in the new device driver. The driver control circuit 132 clears the number of rewrites (sets the number of rewrites to "0") corresponding to all subtables of the target device.

Figure 18:
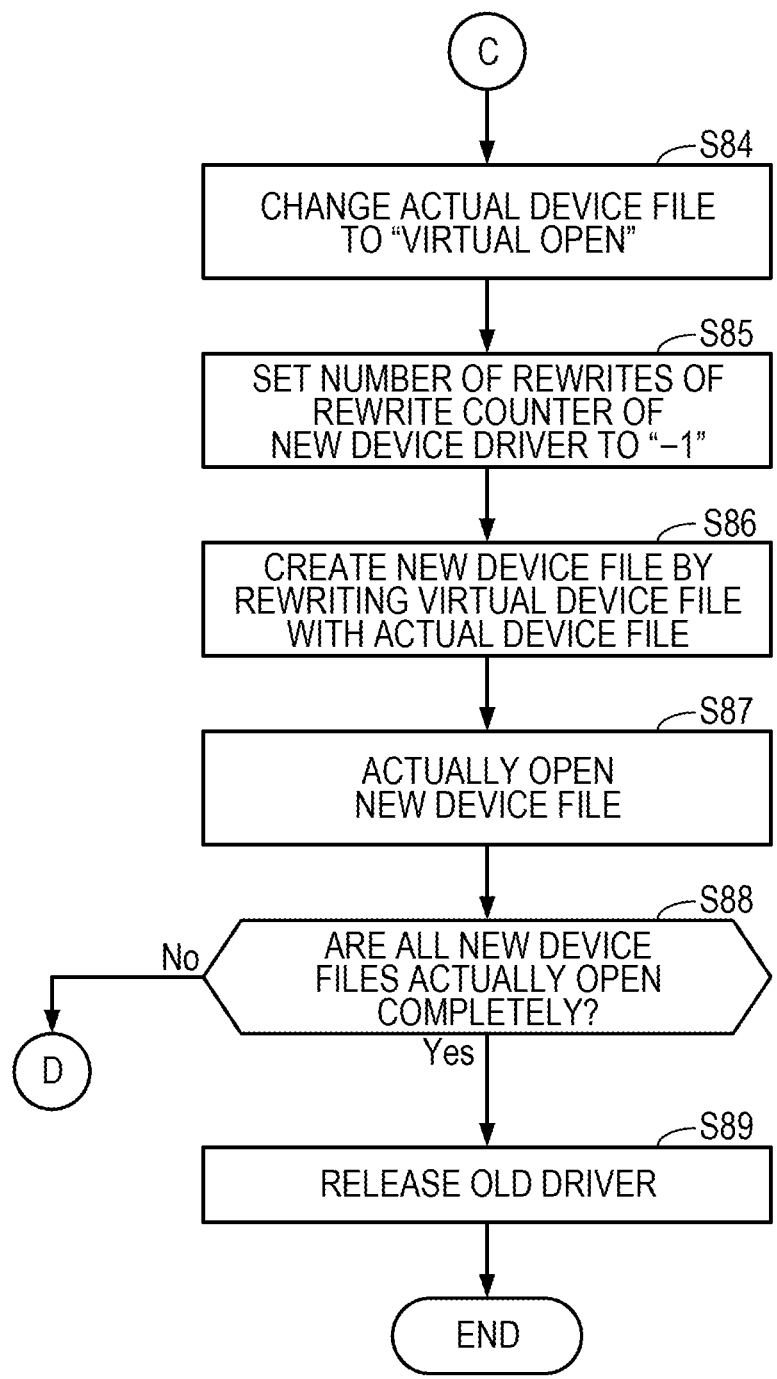
FIG. 18 is a flowchart illustrating the example (continued) of the new driver reading process.

(S83) The driver control circuit 132 sets the next non-switched device as a target device, and proceeds to step S79. FIG. 18 is a flowchart illustrating the example (continued) of the new driver reading process. Hereinafter, the process illustrated in FIG. 18 will be described in order of step numbers.

(S84) The driver control circuit 132 changes the operating state of the actual device file to the virtual open state. The driver control circuit 132 changes the operating mode at the field number "10" of the actual device file to "virtual device". The driver control circuit 132 retains the address at the field number "12" of the actual device file in another storage region, and changes the address to the "entry address of the dev_proxy function" of the new device file.

(S85) The driver control circuit 132 sets the number of rewrites of the rewrite counter 510 to "−1" (initial value) for all subtables retained by the new device driver.

(S86) The driver control circuit 132 creates the new device file by rewriting the virtual device file with the actual device file. Specifically, the driver control circuit 132 changes the field of the field number "10" in the virtual device file to "actual device", and changes the field of the field number "12" in the virtual device file to the address (the address retained in step S84) that is set in the "starting address of memory-mapped I/O" at the field number "12" of the actual device file. Accordingly, the field of the field number "14" in the virtual device file is set as a non-used region. Furthermore, the driver control circuit 132 reflects the setting value of a parameter having a difference in the device initialization table 400 on the setting information indicated by the "starting address of memory-mapped I/O" in the virtual device file. The parameter having a difference is a parameter of which the Read value and the expected value are different from each other in the device initialization table 400. The reflected setting value is the expected value. For a parameter of which the expected value is "none", the existing setting can be used (the setting of the parameter is not changed). The virtual device file of which the settings are changed is the new device file. The driver control circuit 132 sets the operating state of the new device file to "typical reading complete".

(S87) The driver control circuit 132 actually opens (executes the open function) the new device file created in step S86. The operating state of the new device file is set to "typical open". Accordingly, the capabilities of all functions of the new device driver can be used through the new device file. That is, the new device file is started (the new device file is completely started) by step S87. At this point, the driver control circuit 132 uses the logical device name of the new device file as a logical device name for accessing the device, and instructs the IO request processing circuit 131 to access the device through the new device file.

(S88) The driver control circuit 132 determines whether or not all new device files are actually open completely. When all new device files are actually open completely, the driver control circuit 132 proceeds to step S89. When all new device files are not actually open completely, the driver control circuit 132 proceeds to step S78 in FIG. 17.

(S89) The driver control circuit 132 releases (executes the release function) the old device driver, and finishes the new driver reading process of the driver control circuit 132. Specifically, for example, the driver control circuit 132 releases a storage region assigned to the device driver in execution (old device driver) by performing a release process for the device file, and finishes the new driver reading process of the driver control circuit 132.

Figure 19:
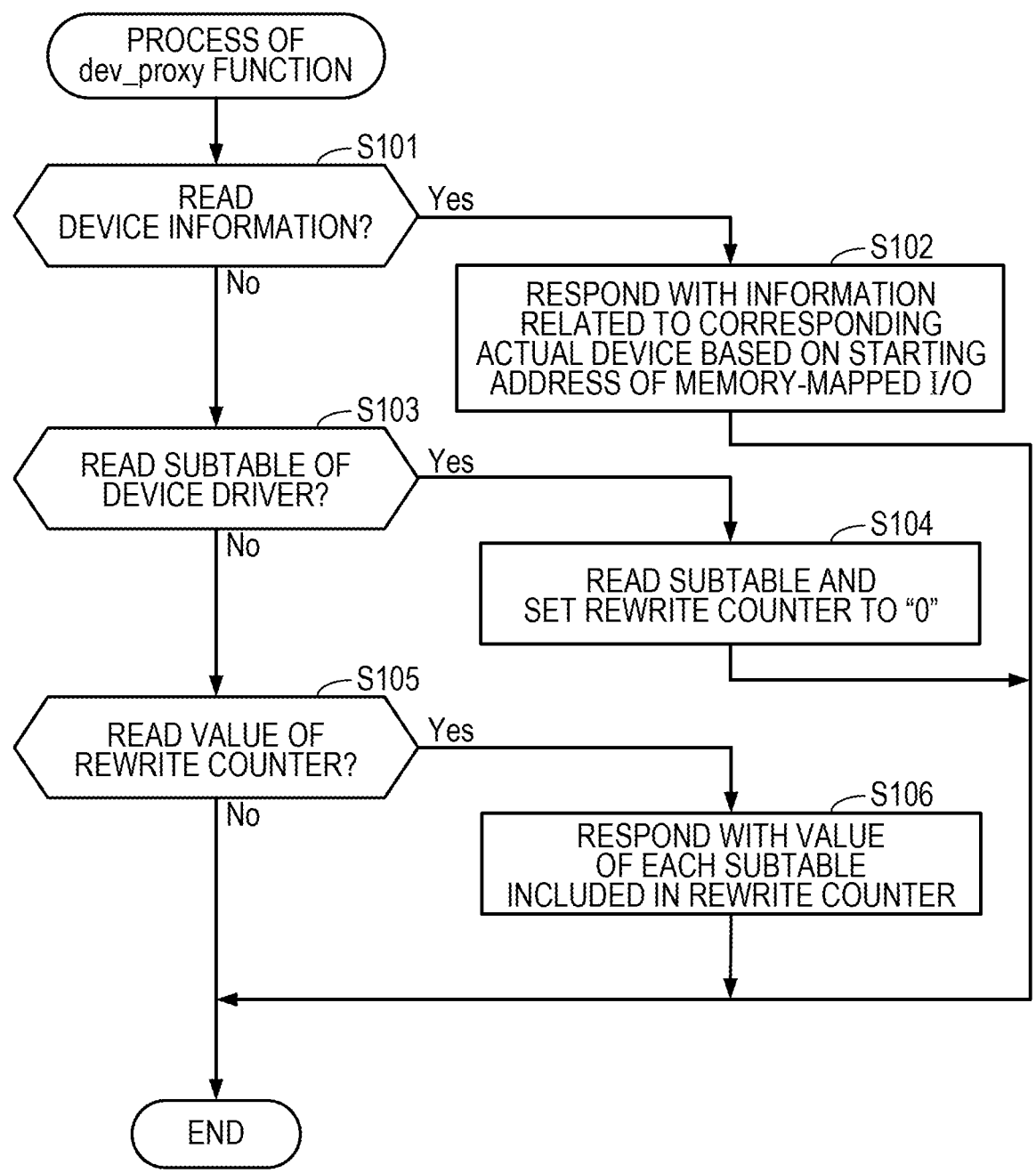
FIG. 19 is a flowchart illustrating a process example of the dev_proxy function.

FIG. 19 is a flowchart illustrating a process example of the dev_proxy function. Hereinafter, the process illustrated in FIG. 19 will be described in order of step numbers.

(S101) The dev_proxy function 145*a* determines whether or not a reading instruction for device information is received. When the reading instruction for the device information is received, the dev_proxy function 145*a* proceeds with the process to step S102. When the reading instruction for the device information is not received, the dev_proxy function 145*a* proceeds with the process to step S103. The reading instruction for the device information is issued by the new device driver in the virtual open state.

(S102) The dev_proxy function 145*a* responds with information related to the corresponding actual device based on the starting address of memory-mapped I/O. The information related to the actual device includes various kinds of setting information (the setting value of a parameter used in the process of the device driver, the setting value of a parameter set in the memory or the register of the actual device, and the like) in the in-operation device driver.

(S103) The dev_proxy function 145*a* determines whether or not the reading instruction for a subtable of the device driver is received. When the reading instruction for a subtable is received, the dev_proxy function 145*a* proceeds with the process to step S104. When the reading instruction for a subtable is not received, the dev_proxy function 145*a* proceeds with the process to step S105.

(S104) The dev_proxy function 145*a* reads the subtable for which the instruction is provided, and responds with the subtable. The dev_proxy function 145*a* sets the number of rewrites to "0" for all subtables in the rewrite counter 510.

(S105) The dev_proxy function 145*a* determines whether or not the reading instruction for the number of rewrites of the rewrite counter 510 is received. When the reading instruction for the number of rewrites of the rewrite counter 510 is received, the dev_proxy function 145*a* proceeds with the process to step S106. When the reading instruction for the number of rewrites of the rewrite counter 510 is not received, the dev_proxy function 145*a* finishes the process.

(S106) The dev_proxy function 145*a* responds with the number of rewrites for each subtable included in the rewrite counter 510, and finishes the process. As described thus far, in the third embodiment, the driver control circuit 132 monitors, at a plurality of timings, whether or not each of a plurality of subtables used in the internal process of the in-operation device driver 145 (current device driver) is updated. At each timing, the driver control circuit 132 performs a process in which a subtable that is not updated until the current timing from the previous timing is copied to the storage region referred to by the new device driver 146. When all of the plurality of subtables are completely copied, the driver control circuit 132 stops the in-operation device driver 145 and switches the in-operation device driver 145 to the new device driver 146.

Accordingly, each subtable retained by the in-operation device driver 145 is moved to the new device driver 146 at a time. In this manner, the device driver that retains a large number of subtables of internal information is efficiently switched by moving each subtable at a time.

While the example of monitoring the number of rewrites for each subtable is described, it is also considered that whether or not each subtable is rewritten is monitored by acquiring a rewrite log for each subtable and determining whether or not the log is updated. For example, a method of performing the switching by stopping the in-operation device driver at a timing when the amount of a new log is small and a time period for reflecting the update is short is considered.

The information processing of the first embodiment can be implemented by the processor 1b executing a program. The information processing of the second and third embodiments can be implemented by the processor 101 executing a program. The programs can be recorded on the computer-readable recording medium 14.

For example, the programs can be distributed by distributing the recording medium 14 on which the programs are recorded. The programs may be stored in advance in another computer, and the programs may be distributed through a network. For example, a computer may store (install) the programs recorded on the recording medium 14 or the programs received from the other computer in a storage circuit such as the RAM 102 or the HDD 103, read the programs from the storage circuit, and execute the programs.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
   a memory configured to store a program of a current device driver used for access to a device and a program of a new device driver that is an updated version of the current device driver; and
   a processor, coupled to the memory, configured to perform an initialization process by acquiring a current device file corresponding to the current device driver and creating a virtual device file for the new device driver based on the current device file while access to the device using the current device driver is permitted, and generating a new device file by reflecting a setting information difference between setting information in the current device driver and setting information in the new device driver on the virtual device file while the access to the device using the current device driver is not permitted, start the new device driver using the new device file, and switch the current device driver to the new device driver.

2. The information processing apparatus according to claim 1,
   wherein the current device driver includes a first function that responds with the setting information in the current device driver, and
   the processor acquires the setting information in the current device driver by executing the first function through the virtual device file while the access is permitted.

3. The information processing apparatus according to claim 1,
   wherein the new device driver includes a second function that responds with the setting information in the new device driver, and
   the processor sets, in the current device file, an address of the second function in the memory when performing the switching.

4. The information processing apparatus according to claim 1,
   wherein the processor acquires a busy response from the new device driver with respect to an access request that is made for the device through the virtual device file.

5. The information processing apparatus according to claim 1,
   wherein when existing access using the current device driver is complete, the processor stops the current device driver and performs the switching.

6. The information processing apparatus according to claim 1,
   wherein the processor monitors, at a plurality of timings, whether or not each of a plurality of tables used in a process of the current device driver is updated, performs, at each timing, a process in which a table that is not updated until a current timing from a previous timing is copied to a storage region referred to by the new device driver, and performs the switching when all of the plurality of tables are completely copied.

7. A switching method of device drivers in an information processing apparatus including a memory that stores a program of a current device driver used for access to a device and a program of a new device driver that is an updated version of the current device driver and a processor coupled to the memory, that performs a process, the process comprising:
   acquiring a current device file corresponding to the current device driver;
   creating a virtual device file for the new device driver based on the current device file while access to the device using the current device driver is permitted;
   generating a new device file by reflecting a setting information difference between setting information in the current device driver and setting information in the new device driver on the virtual device file while the access to the device using the current device driver is not permitted;
   starting the new device driver using the new device file; and
   switching the current device driver to the new device driver.

8. A non-transitory computer-readable recording medium storing a program that causes a processor to execute a process, the process comprising:
   acquiring a current device file corresponding to the current device driver;
   creating a virtual device file for the new device driver based on the current device file while access to the device using the current device driver is permitted;
   generating a new device file by reflecting a setting information difference between setting information in the current device driver and setting information in the new device driver on the virtual device file while the access to the device using the current device driver is not permitted;

starting the new device driver using the new device file; and switching the current device driver to the new device driver.

* * * * *